⊢—10 MICRONS—⊣

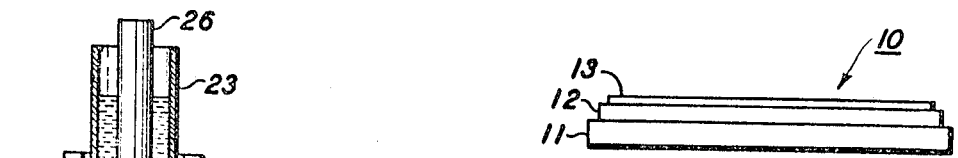
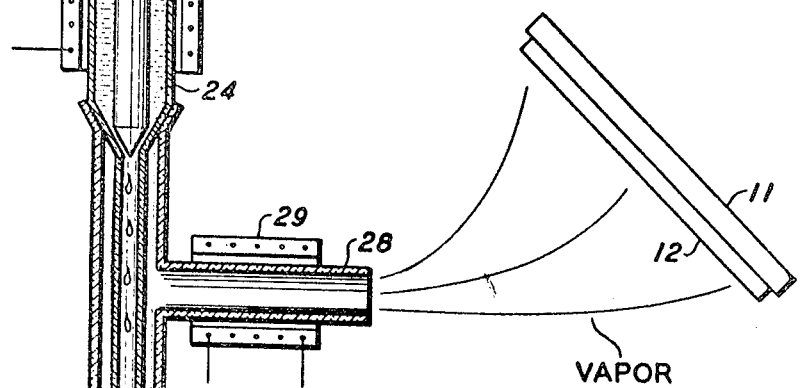
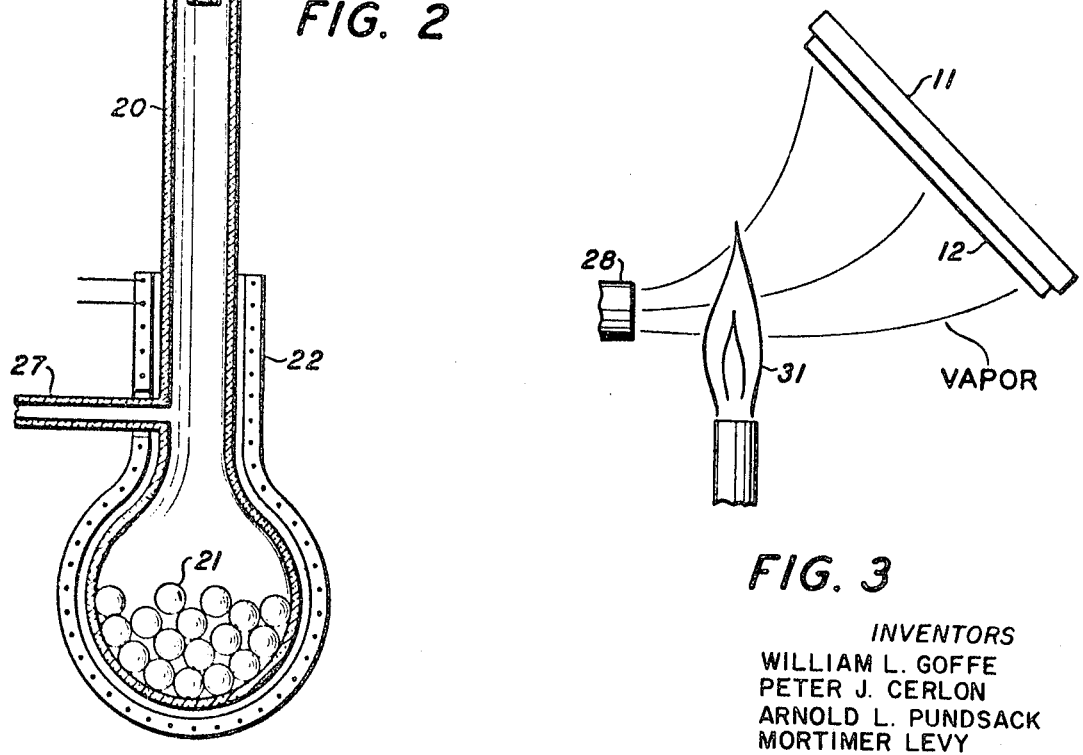
FIG. 1
FIG. 2
FIG. 3
INVENTORS
WILLIAM L. GOFFE
PETER J. CERLON
ARNOLD L. PUNDSACK
MORTIMER LEVY
DAVID A. BUCKLEY
FRANK G. BELLI
David C. Petre
ATTORNEY Aug. 10, 1971    W. L. GOFFE ET AL    3,598,644
IMAGING MEMBER FABRICATION
Original Filed April 3, 1969    2 Sheets-Sheet 2

⊢—5 MICRONS—⊣

⊢—10 MICRONS—⊣

⊢—5 MICRONS—⊣

⊢—1 MICRON—⊣

⊢—5 MICRONS—⊣

United States Patent Office 3,598,644
Patented Aug. 10, 1971

3,598,644
IMAGING MEMBER FABRICATION
William L. Goffe, Webster, Arnold L. Pundsack, Mortimer Levy, and David A. Buckley, Rochester, and Frank G. Belli, Webster, N.Y., and Peter J. Cerlon, Closter, N.J., assignors to Xerox Corporation, Rochester, N.Y.
Continuation of application Ser. No. 813,345, Apr. 3, 1969, which is a continuation-in-part of application Ser. No. 423,167, Jan. 4, 1965. This application Mar. 17, 1970, Ser. No. 19,521
Int. Cl. C09d 5/24; G03g 5/04
U.S. Cl. 117—201
32 Claims

ABSTRACT OF THE DISCLOSURE

Selenium vapor deposition methods of forming a fracturable layer comprising selenium contiguous the surface of a softenable layer.

CROSS REFRENCES TO RELATED APPLICATIONS

This application is a continuation of applicants' copending application Ser. No. 813,345, filed Apr. 3, 1969, now abandoned, which in turn is a continuation-in-part of applicants' copending application Ser. No. 423,167, filed Jan. 4, 1965, now abandoned.

BACKGROUND OF THE INVENTION

This invention relates in general to imaging and more specifically to a migration imaging system and novel methods of forming especially preferred and optimum imaging members for use therein. A related article is Chiang and Ing, Studies on Inorganic-Organic Polymer Interfaces, 8 Polymer Preprints #2 (September 1967).

There has recently been developed a migration imaging system capable of producing high quality images of high density, continuous tone and high resolution, an embodiment of which is described in copending application Ser. No. 460,377, filed June 1, 1965, now U.S. Pat. 3,520,681 which is a continuation-in-part of application Ser. No. 403,002, filed Oct. 12, 1964, now abandoned. Generally, according to an embodiment thereof, an imaging member comprising a substrate and an overlying layer of softenable material, containing photosensitive particles is imaged in the following manner: a latent image is formed on the member, for example, by uniformly electrostatically charging and exposing it to a pattern of activating electromagnetic radiation. The imaging member is then developed by exposing it to a solvent which dissolves only the softenable layer. The photosensitive particles which have been exposed to radiation migrate through the softenable layer as it is softened and dissolved, leaving an image of migrated particles corresponding to the radiation pattern of an original, on the substrate with the material of the softenable layer substantially completely washed away. The particle image may then be fixed to the substrate. For many preferred photosensitive particles, the image produced by the above process is a negative of a positive original i.e., the resultant particle image corresponds to the light struck portions of the imaging member. However, positive-to-positive systems are also possible by varying the image parameters. Those portions of the photosensitive material which do not migrate to the substrate are washed away by the solvent with the softenable layer.

As disclosed therein and as further described in copending application Ser. No. 725,676, filed May 1, 1968, and now abandoned, by other developing techniques, the softenable layer may at least partially remain behind on the supporting substrate especially where migration material from a layer of photosensitive migration material is caused to migrate in image configuraton in depth in a softenable layer by reason of the mechanism of softening the softenable layer as opposed to the dissolved and washing away of said layer to cause migration of fracturable material to the substrate.

A basic and especially preferred imaging member is more specifically described in 725,676 as a layer configuration comprising a layer of softenable material typically on a substrate with a layer of fracturable and preferably particulate photosensitive migration material contiguous the upper surface of the softenable layer. Imaging member variations include a related structure where the migration layer is overcoated with a second overcoating of softenable material which sandwiches the migration layer. Fracturable layer as used herein refers to any migration layer and specifically all the migration layer forms disclosed herein including Swiss cheese layers and those layers comprising discrete particles and those comprising apparently more mechanically continuous layers with a microscopic network of lines of mechanical weakness or which are otherwise fracturable and not completely mechanically coherent in the process hereof, which in the imaging member configurations hereof and their equivalents; in response to electrical charging, imagewise exposure to activating radiation and solvent contact are caused to selectively deposit in image configuration on a substrate.

"Contiguous," for the purposes of this invention, is defined as in Webster's New Collegiate Dictionary, second edition, 1960; "In actual contact; touching; also, near, though not in contact; adjoining."

The present invention is particularly directed to methods of forming novel electrically photosensitive fracturable migration layers comprising selenium, which are found to be especially preferred for optimum results in said migration imaging system. Since application 725,676 specifically and definitively treats the subject of migration imaging and because of the detailed description of techniques to create imaged members with special emphasis on softenable layer and substrate layer portions of imaging members, the entire disclosure of the specification and claims of 725,676, for purposes of indicating the background of the invention, is hereby expressly incorporated herein by reference.

SUMMARY OF THE INVENTION

It is, therefore, an object of this invention to provide a method of forming an imaging member.

It is a further object of this invention to provide a novel method of forming a layered imaging member for use in a migration imaging system.

It is a still further object of this invention to provide a novel method of forming a fracturable layer comprising selenium contiguous the surface of a softenable layer.

It is a still further object of this invention to provide a novel method of forming a fracturable layer comprising selenium wherein the fracturable layer is at least partially embedded in the surface of the softenable layer.

It is a still further object of this invention to provide a novel method of forming a layer comprising amorphous selenium said layer is at least partially embedded in the surface of the softenable layer.

It is a still further object of this invention to provide a novel method of forming a fracturable layer comprising particles completely embedded in and contiguous a surface of a softenable layer.

The foregoing objects and others are accomplished in accordance with this invention by providing novel methods of forming a fracturable layer comprising selenium contiguous another layer which is preferably a softenable layer which is preferably thermoplastic. The selenium component of the fracturable layer preferably comprises amorphous selenium and may include alloys of amorphous selenium such as amorphous selenium alloyed with arsenic, tellurium, antimony, thallium, bismuth and mixtures thereof, as well as other materials including substantially pure amorphous selenium, and may include substantially pure amorphous selenium or amorphous selenium alloys doped with such materials as halogens, for example see Straughan Pat. 3,312,548.

The optimum processes described herein give preferred fracturable layers comprising amorphous selenium which optimally are at least partially embedded in the softenable layer and are substantially completely composed of small, discrete, embedded particles. These films give optimum quality images. Preferred films which still may be imaged to give commercially acceptable images have particles which are also at least partially embedded but which are initially mechanically joined to other adjacent particles, for example in dumbbell fashion.

BRIEF DESCRIPTION OF THE DRAWINGS

For a better understanding of the invention as well as other objects and further features thereof, reference is made to the following detailed disclosure of the invention taken in conjunction with the accompanying drawings wherein:

FIG. 1 is a cross-sectional, partially schematic view of a photosensitive member according to the invention.

FIG. 2 is a partially schematic illustration of one embodiment of apparatus useful in carrying out the process of the invention.

FIG. 3 is a partially schematic illustration of a preferred process embodiment of the invention.

DESCRIPTION OF THE PREFERRED EMBODIMENTS

Figure 10:
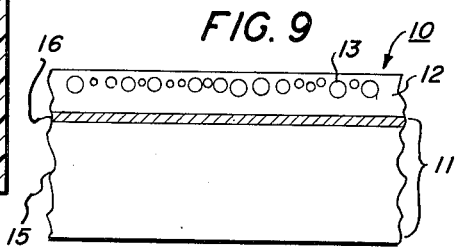
FIG. 10 is a drawing of about a 20,000× photomicrograph of a cross section of an imaging member and specifically a completely embedded layer 13 made by an optimum process of this invention.

Referring now to FIGS. 1 and 10 there is shown a schematic illustration and a drawing of an actual photomicrograph, respectively, of an example of one embodiment of an imaging member 10 comprising substrate 11, softenable layer 12 which contains contiguous its upper surface a fracturable migration layer 13 according to this invention comprising selenium.

Substrate 11 may be electrically conductive or insulating and may be almost any structural material having reasonable solvent resistance if the member is going to be used in the wash-away mode hereof or heat resistance if the imaging member is to be used in the heat softening mode of the above described migration imaging system. Suitable substrate materials include glass, metal, paper, plastic materials especially the tougher plastic materials such as polyester film i.e., Mylar polyethylene terephthalate polyester film from Du Pont. By preference, although not of necessity, substrate 11 may either be electrically conductive or carry a thin electrically conductive coating as the upper surface of the substrate. These conductive substrates generally facilitate the charging or sensitization of the member according to the preferred migration imaging process mode of uniformly electrostatically charging, exposing and development. As is well known, suitable conductive coatings for glass include tin oxide as well as metallic coatings and suitable conductive coatings for paper or plastic include thin films of copper iodide. One example of this type of substrate is NESA glass which is a partially transparent tin oxide coated glass available from Pittsburgh Plate Glass Company. Another typical substrate, shown in FIG. 10 comprises Mylar 15 which has a thin semi-transparent aluminum coating 16 on the upper surface of the Mylar film. If substrate 11 is a naturally transparent material such as glass or plastic, the utility of the imaging member 10 may be increased by using a transparent electrically conductive coating. The previously enumerated conductive coatings are adequately transparent when applied as thin films. Alternatively, the conductive coating may be omitted entirely and an electrically insulating substrate 11 used, which opens up a wide variety of film formable materials such as plastics for use as substrate 11. The substrate may be in any suitable form such as a metallic strip, sheet, coil, cylinder, drum, endless belt, moebius strip or the like. Suitable substrates for withstanding high temperatures include polysulfone and chlorinated polycarbonates.

Overlying substrate 11 is a thin layer 12 of a softenable material typically electrically insulating which may comprise one or more layers of softenable materials and may be any suitable material, preferably a plastic and thermoplastic material which is softenable, for example, in a solvent liquid, solvent vapor, heat or combinations thereof. Additionally because of the above described migration system imaging system wherein imaging member 10 is advantageously employed, the layer 12 should be substantially electrically insulating during the imaging cycle. Layer 12 may be formed by any suitable method including roll coating on substrate 11 from a solvent solution. In general, layer 12 may be referred to as a thermoplastic material since such materials are preferred in the migration imaging system thereof, although non-thermoplastic materials have also been found to be suitable in some instances.

Substantially electrical insulating as used herein to define softenable layer 12, means that the layer is insulating enough to prevent the fracturable material from losing its charge before (a) migrating to the substrate in the solvent wash away mode thereof or before (b) at least some migration takes place in the migration imaging modes where the softenable layer is softened and not washed away during development.

Preferred thermoplastic materials for at least the upper surface of layer 12 because of their adaptability to form preferred fracturable migration layers comprising selenium by the novel process hereof to thereby give imaging members which may be imaged to form preferred and optimum quality images according to the above described migration imaging system include amorphous organic glasses including specifically Staybelite Ester 10 a partially hydrogenated (about 50%) rosin glyceryl ester; Foral Ester 10, hydrogenated Staybelite Ester 10, both from Hercules Powder Company and sucrose octo benzoate from Tennessee Eastman Co.; polystyrenes including specifically Piccolastic A–75 a polystyrene from Pennsylvania Industrial Chemical Corp., and an inhouse derived polymer made by oxidizing Piccotex 100; substituted polystyrenes including specifically Piccotex 100 about a 10/90 mole percent styrene-vinyl toluene copolymer from Pennsylvania Industrial Chemical Corp., also including para-isobutylstyrene, $\alpha$ and $\beta$ alkyl substituted polystyrenes, vinyl toluenes, vinyl xylenes and vinyl cumenes; styrene-acrylate copolymers including specifically custom synthesized copolymers of styrene and various acrylates such as octyl acrylate and docosylacrylate and methacrylates such as butyl, ethyl and hexyl methacrylates; polyolefins including specifically Piccopale-100 a highly branched unsaturated olefin, HP–100 a non-commercial hydrogenated Piccopale–100 and Piccopale H–2 virtually identical to HP–100 all obtained from Pennsylvania Industrial Chemical Corp.; polyesters such as a custom synthesized bisphenol-A polyadipate; polycarbonates such as polycarbonate, from 4,4′-isopropylidenedi-o-cresol and polycarbonate from 4,4′-methylene di-o-cresol; silicones including specifically methylphenyl silicone resin SR–82 from G.E. Co., methylphenyl silicone C4–2044 from Dow Chemical Co., and methylphenyl silicone resin R5061A from Dow Corning and alkyds including specifically a rosin derived alkyd resin Neolyne 23 from Hercules Powder Co.; and polymers, copolymers, oligomers and mixtures thereof.

However, any suitable softenable material may be used as layer 12 and an exemplary listing of such materials follows.

Typical substantially electrically insulating softenable materials include SR type silicone resins available from General Electric Corporation; Sucrose Benzoate, Eastman Chemical; Velsicol X–37, a polystyrene-olefin copolymer from Velsicol Chemical Corp.; Piccolastic 100 and 125, both polystyrenes, Piccodiene 2215, a polystyrene-olefin copolymer, all from Pennsylvania Industrial Chemical Corp.; Araldite 6060 and 6071, epoxy resins from Ciba; Epon 1001, a bisphenol A-epichlohydrin epoxy resin, from Shell Chemical Corp.; and PS–2, PS–3, both polystyrenes, and ET–693 a phenol-formaldehyde resin, from Dow Chemical; a custom synthesized polydiphenylsiloxane; a custom synthesized polyadipate; acrylic resins available under the trademark Acryloid from Rohm & Haas Co., and available under the trademark Lucite from the E. I. du Pont de Nemours & Co.; thermoplastic resins available under the trademark Pliolite from the Goodyear Tire & Rubber Co.; a chlorinated hydrocarbon available under the trademark Aroclor from Monsanto Chemical Co.; thermoplastic polyvinyl resins available under the trademark Vinylite from Union Carbide Co.; other thermoplastics disclosed in Gunther et al. Pat. 3,196,011; waxes and blends, mixtures and copolymers thereof.

The softenable layer 12 may be of any suitable thickness with thicker layers generally requiring a greater electrostatic potential in the preferred processing modes of the migration imaging system. Thicknesses of from about ½ to about 16 microns have been found to be preferred but a uniform thickness over the imaging area from about 1 to about 4 microns provides for high quality images while permitting ready image member construction.

Layer 13 made according to the invention is a fracturable layer comprising selenium and preferably comprising amorphous selenium. Imaging member 10 may be imaged as in the migration imaging process described in Ser. No. 403,002, filed Oct. 12, 1964, now abandoned and as described in 725,676. By way of illustration from 403,002, one imaging process consists of electrostatically charging the photoconductive layer 13 to a potential in the range of 60–100 volts, exposing the photosensitive member in a camera, and dipping the photosensitive member in trichloroethylene solvent. The solvent washes away layer 12 and causes the photoconductive material of layer 13 to deposit in image configuration on substrate 11 in the areas previously exposed to light. In non-light struck areas layer 13 simply washes away together with layer 12.

This invention is directed to two novel techniques of making fracturable layers 13 comprising selenium.

One method comprises vacuum evaporating the material comprising selenium onto a vapor receiving surface which is preferably a softenable layer 12 which is typically on a substrate 11. Conventional vacuum apparatus may be employed operating in the vacuum range of $10^{-4}$ torr or better. This vacuum is merely illustrative of typical conditions under which vacuum evaporation will work and it should be understood that higher vacuums such as $10^{-6}$; $10^{-8}$ torr or even higher and also lower vacuums than $10^{-4}$ are also suitable. The selenium used should preferably be of a high purity grade, such as that used and sold for making xerographic plates. It should be noted, however, that as mentioned in 403,002, selenium purity requirements appear to be less stringent than those pertaining to the manufacture of conventional xerographic plates.

The selenium is preferably evaporated onto the vapor receiving softenable layer and preferably thermoplastic surface under conditions which result in the formation of a discontinuous layer of selenium particles, discontinuous in the sense that the layer is comprised of small individual particles which may or may not be in contact with neighboring particles. Such films are useful in the migration imaging methods previously referred to above whereas completely mechanically continuous selenium layers such as those used as photoconductor layers in xerography, are not.

It is also possible and it is an optimum embodiment hereof that the selenium is optimally evaporated onto the vapor receiving softenable layer and preferably thermoplastic surface under optimum conditions which result in a migration layer 13 comprising selenium which is almost entirely in the form of sub-microscopic, spherical particles which are small and discrete from each other and which are partially embedded in and optimally, as shown in FIG. 10, completely embedded in the softenable layer contiguous the vapor receiving surface of the softenable layer.

It has been found that film 13 thicknesses and the temperatures of the vapor receiving softenable layer and preferably thermoplastic surface 12 (especially as said temperatures affect the viscosity of the vapor receiving surface) are important parameters in securing the desired, preferred and optimum type of films 13. In general the preferred size of the selenium particles is usually less than about one micron but range from about 0.01–2.0 microns with the thickness of the selenium layer generally being that of the size of the selenium particles, the layer containing between about 4 to about 100 micrograms of material/square cm. Particles larger than about 2.0 microns are difficult to achieve without undue joining together with adjacent particles which forms a more mechanically continuous type film which is undesirable. Also, particle size has a direct bearing on the photographic properties of the finished film and it has been found that particles larger than about 2.0 microns do not yield optimum resolution and also show a reduction in image density as compared to images having particles less than about 2.0 microns. Accordingly, selenium films prepared by this method generally will have a thickness of 1 or 2 microns or less. A thickness of about 0.2 micron has been found to be particularly suitable. In layer 13 thicknesses above about 2 microns the selenium particles tend to coalesce to form relatively mechanically continuous layers and it becomes increasingly difficult or impossible to form fracturable layers and especially the optimum films of disconnected particles.

It was recognized and disclosed in aforementioned copending application 423,167 that substrate temperatures, especially as they relate to temperatures of the vapor receiving softenable layer surface, were a critical and important limitation in obtaining preferred fracturable layers comprising amorphous selenium. It was stated that the critical limitation was that the suitable films were formed at substrate temperatures between about 60° C. and about 90° C. whereas outside these temperature limits the films tend to be continuous even when very thin or crystallize and fall off. Now, more precisely, it has been found that temperature is important especially as it effects the viscosity of the vapor receiving surface. When the critical temperature limitation of about 60° C. to about 90° C. is applied to the vapor receiving surface material Staybelite Ester 10, specifically disclosed in the parent copending application 423,167 it has been measured that the viscosity of Staybelite Ester 10 at about 60° C. is about $10^6$ poises while Staybelite Ester 10 heated to about 90° C. has a viscosity of about $10^3$ poises. This viscosity range of from about $10^3$ to about $10^6$ poises is an optimum viscosity range for the softenable layer vapor receiving surface during the vapor depositions hereof. Typically materials with a viscosity of about $10^3$ poises are very viscous liquids while materials at about $10^6$ poises present a surface that is tacky to the touch. In particular, vapor depositing by the methods described herein, wherein the vapor receiving softenable layer surface is in the above described optimum viscosity range provides for at least partial embedment of the layer 13 being formed in the vapor receiving surface, embedment being critical in the preferred and optimum processes hereof.

Vapor receiving surfaces with viscosities up to about $10^9$ poises have also been found to produce suitable films for use in migration imaging and this is thus a preferred range but generally at these higher viscosities undesirably long evaporating times and very low evaporation rates must be used in order to preserve the fracturable and optimally particulate nature of the evaporated film.

Viscosities as used herein are measured in samples of bulk material heated to the above specified temperatures or otherwise so softened for example by solvent vapor to cause preferred and optimum layers 13 to be deposited by the methods hereof contiguous the vapor receiving surface of the materials. Viscosities herein were measured with the low shear rate Pocklington method (Pocklington, Proc. Cambridge Phil. Soc. 36, 507 (1940)) or an Instron capillary viscosimeter available from Instron Corp. of Canton, Mass., although of course any suitable viscosity measuring technique may be used, taking into mind that viscosity values used were at low shear rates.

To illustrate, FIGS. 4–8 represent electron micrographs of layers deposited under different vapor receiving surface temperatures and viscosities.

Figure 4:
FIGS. 4–9 are continuous tone lithographic offsets of electron micrographs of different forms of fracturable layers comprising amorphous selenium formed by the processes of this invention with, in FIG. 8, the softenable layer material shown by cross hatching.
Figure 5:
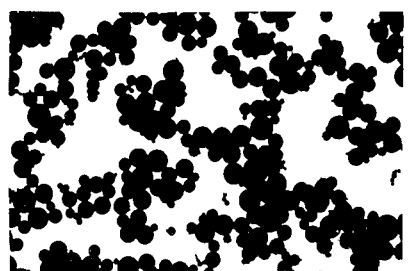
Figure 6:
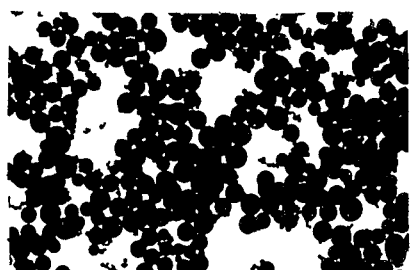
Figure 7:
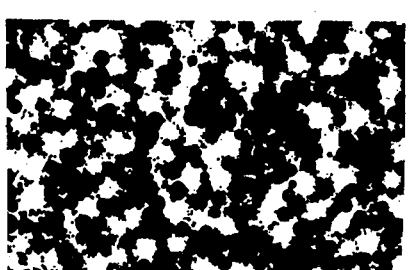

FIG. 4 is a micrograph of selenium film prepared on a surface maintained at about 40° C. The film is essentially continuous although marked by fissures. It is not useful in the migration methods set forth above in 403,002. FIGS. 5 and 6 are electron micrographs of films prepared at surface temperatures of about 83° C. and about 85° C. respectively. The films are essentially composed of discrete spherical particles and are highly satisfactory when used in the migration imaging method defined in the above mentioned applications. FIG. 7 is directed to a film deposited at a surface temperature of about 87° C., this film is only marginally useful. There is evidence of fusion between the particles in this figure.

Figure 8:
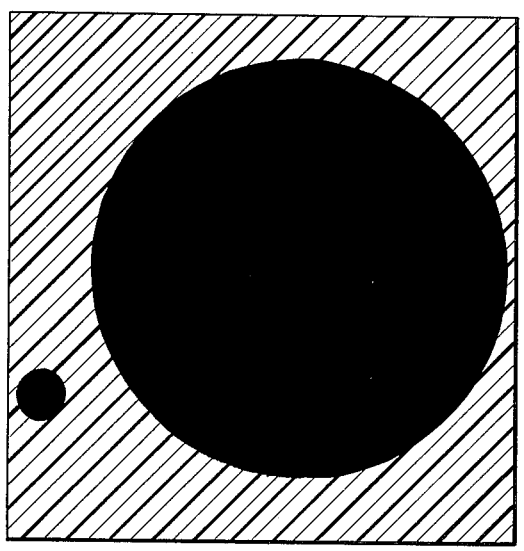

FIG. 8 is an electron micrograph at increased magnification of a portion of a film of the type shown in FIGS. 5 and 6. It shows, along with a nearly spherical about 0.2 micron particle, a 1.6 micron selenium particle which is completely spherical and free of facets and other evidence of crystallization. FIG. 8 shows complete embedment of the particles in the softenable layer material shown by the crosshatching.

During vacuum evaporation the vapor receiving surface temperature may be difficult to determine during the actual evaporation step. Normally, support layer 11 is clamped against a platen of some type in the evaporation chamber, and the temperature of the platen is measured. Temperature is generally measured at the platen whereas actually the deposition is taking place at the surface of the thermoplastic layer 12 which is a relatively poor conductor of heat. For this reason, it is difficult to determine the actual temperature of the surface upon which the selenium is being deposited. Platen temperature however is a useful guide to the surface temperature although the exact relationship between the two temperatures will depend upon the nature of layers 11 and 12, as well as the geometry of the particular evaporation chamber being employed. However, the temperatures indicated above together with the electron micrographs showing the influence of temperature on the film properties will make it possible to duplicate the type of film illustrated in FIGS. 5 and 6.

The preferred rate of vapor deposition for vacuum evaporation of selenium or selenium alloys may range from about 0.005 micron per minute to about 15 microns per minute. It should be understood, however, that for commercial production runs, for example, where the vapor receiving surface is continually moving past the selenium source, deposition rates even exceeding these magnitudes may be used when large production is required.

In the second advantageous process embodiment of this invention, selenium vapors are carried to layer 12 or other suitable surface for deposition thereon, in a stream of gas inert to the selenium such as for example nitrogen. FIG. 2 illustrates a form of apparatus suitable for carrying out this process embodiment of the invention. Container 20, conveniently made out of glass, is partly filled with glass balls 21. Container 20 is provided with a heating coil 22 adapted for connection to a source of electricity, not shown. A second container 23 rests in the top of container 20 and contains selenium 24. Container 23 includes a downward extending spout 25 which extends into container 20. A rod 26 extends into container 23 and is used as a valve to control communication between container 23 and spout 25. Container 23 is also provided with a heating coil 30 adapted for connection to a source of electricity not shown. In operation, heating coil 30 is energized in order to melt the selenium in a container 23 and rod 26 is operated to permit the molten selenium to drip into container 20 at the desired rate. Heating element 22 is also energized to heat glass balls 21 somewhat beyond the boiling point of selenium. As the selenium drops onto glass balls 21, it is converted into a black selenium vapor. The inlet tubulation 27 is connected to a source of inert gas, not shown, and sweeps the selenium vapors out of container 20 through exit tubulation 28. A suitable surface, such as a thin layer of thermoplastic 12 on support 11 is placed in front of exit tubulation 28. The selenium vapors will condense on layer 12 and form a deposit.

Figure 9:
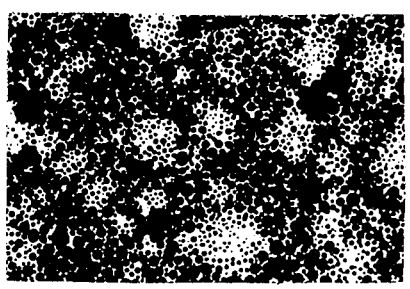

It has been discovered that if the black selenium vapors are supplied with additional heat the vapor will undergo an apparent instantaneous transformation to the distinctly visible red form. This transformation is very striking when observed with the naked eye. If heating elements 29 at exit tubulation 28 are connected to a source of electricity and heated until glowing, the black selenium vapors can be transformed to the red form. The film forming properties of the red form of selenium are drastically different from that of the black form and consistently lead to the deposition of a thin film consisting essentially of spherical particles performing very satisfactorily in the above described migration imaging process. The vapor receiving surface viscosities and substrate temperatures to be used with this process are the same range as those to be used with vacuum deposition embodiment described above. FIG. 9 is an electron micrograph of such a layer. Although the particles formed by this embodiment show a greater variation in size than those deposited under vacuum conditions, this size variation is not detrimental to the imaging forming properties of the layer. Heating element 29 provides additional heat to the selenium vapors, but the method of applying heat is in no way critical and any suitable method may be used.

It is found that the red vapors result in preferred, spherically shaped, amorphous selenium particles forming on the vapor receiving surface. But, of course, it is appreciated that the black selenium vapors can also be used to form selenium particles which are typically at least partially crystalline and which may be used in the process described in 403,002.

In general, the temperature range for forming the selenium in the black vapor form ranges from the melting temperature of selenium, about 217° C. up to about 300° C. In order to obtain the transfer from the black vapor form to the red form, the temperature of the vapors should be increased at least to a temperature in the range of between about 300° C. to about 500° C.

The diffuser illustrated in FIG. 2 was used to deposit an optimum submicron size, discrete particle embedded layer of amorphous selenium-tellurium by having a melt of about 25% tellurium and about 75% selenium in container 23. Nitrogen was used as the inert gas entrancing from tube 27. The selenium-tellurium vapor as it exited from tube 28 had been additionally heated so as to be in the preferred distinctly red form.

FIG. 3 shows a modified version of the second process embodiment hereof wherein heating element 29 is dispensed with and a flame 31, such as a propane gas flame from a conventional bunsen burner, well known to have a temperature of about 500–600 C., is interposed between the exit tubulation 28 and a surface upon which the selenium film is to be formed. This form of apparatus is just as effective as that of FIG. 2. Again, there is an almost instantaneous and clearly visible change of vapor color from black to red as the selenium vapors passes through the flame. The apparatus of FIGS. 2 and 3 has been found to give good results but any suitable apparatus may be used. This form of apparatus provides good control over the rate of evolution of selenium vapor and thus over the rate of deposition of selenium vapor on a layer 12 coated substrate, but different and simpler forms of apparatus may also be used. For example, an inert gas may be passed over a pool of molten selenium to entrain the rising selenium vapors or an inert gas may be bubbled through a pool of molten selenium. In each case, black selenium vapor is entrained in the inert gas and must be converted to the red form by the application of additional heat. It is believed that it is preferable to convert the vapor from the black to red form as soon before the application of vapor to the vapor receiving surface as possible.

The following examples specifically define the present invention with respect to methods of preparing fracturable layers comprising selenium contiguous the surface of a vapor receiving surface which is preferably a thermoplastic. The parts and percentages are by weight unless otherwise indicated. The examples are intended to illustrate various preferred embodiments of this invention.

After the deposition, the film is rapidly chilled to room temperature or below before being wound up to create an imaging member as illustrated in FIG. 10 of about a monolayer 13 of amorphous selenium spheres approximately one-quarter micron in diameter embedded about 0.1 micron below the surface of the layer 12 of the copolymer of styrene and hexylmethacrylate. 16 is a thin layer of about 50% white light transmissive aluminum on about a 3 mil layer 15 of Mylar polyester film.

EXAMPLES II–XII

In the following 11 examples, various preferred thermoplastics in the form of about 1.5 to about 2 micron thick layers on a substrate as in Example I are used as vapor receiving surfaces in the vacuum evaporation of substantially pure xerographic grade selenium held in a crucible at a temperature of between about 275° C. to 315° C. Vacuums were held at between about $10^{-4}$–$10^{-6}$ torr and the distance from the surface of the selenium in the boat and the vapor receiving surface was varied from between about 6 to about 12 inches.

The pertinent information as it is related to the inventive process hereof is given in columnar form. The five columns specify, from left to right, the particular thermoplastic vapor receiving surface material; the viscosity of the vapor receiving surface; as indicated by the temperature T of the vapor receiving surface substrate which is a close approximation of the temperature of the vapor receiving surface; the rate of evaporation and finally the diameter, in microns, of the selenium spheres in the examples where diameter was measured. In each example a preferred migration layer is formed of submicron size amorphous selenium spheres completely embedded just below the vapor receiving surface. Some of the evaporations were dynamic as in Example I and some were static.

| Vapor receiving surface thermoplastic | Viscosity (poise) at T | T (° C.) | Rate of evaporation in microns/ minute | Type of deposited layer |
|---|---|---|---|---|
| II.—Same copolymer as in Example I | $2.5 \times 10^3$ | 60 | 0.014 | 0.14 |
| III.—Same copolymer as in Example I | $1.7 \times 10^6$ | 85 | 0.069 | 0.1 |
| IV.—Same copolymer as in Example I | $3.5 \times 10^3$ | 120 | 10.0 | |
| V.—A custom synthesized 73-27 mole percent copolymer of styrene and hexylmethacrylate having an intrinsic viscosity at 25° C. of about 0.14 dl./gm. | $10^5$ | 95 | 2 | 0.4 |
| VI.—Piccopale H-2 | $3 \times 10^4$ | 80 | 2 | 0.3 |
| VII.—A custom synthesized 85-15 mole percent copolymer of styrene and paradecylstyrene having a glass transition temperature of about 59° C. | $1.3 \times 10^5$ | 99 | 2 | 0.3 |
| VIII.—About a 50/50 mole percent copolymer of styrene and butyl methacrylate having an intrinsic viscosity at 25° C. of about 0.22 dl./gm. | $2 \times 10^5$ | 100 | 2 | 0.28 |
| IX.—Same thermoplastic as in Example I except that the molecular weight is about 150,000 (weight average) | $4.5 \times 10^4$ | 115 | 2 | |
| X.—Piccotex 100 | $8 \times 10^4$ | 85 | 0.15 | |
| XI.—Staybelite Ester 10 | $10^3$ | 90 | 0.03 | 0.3–0.4 |
| XII.—Staybelite Ester 10 | $10^6$ | 60 | 0.03 | 0.3–0.4 |

EXAMPLE I

A film of aluminized Mylar overcoated with about a 1.5 micron thick layer of a custom synthesized 80/20 mole percent copolymer of styrene and hexylmethacrylate having a molecular weight of about 45,000 (weight average) is advanced at a rate of about 5 feet/minute into a vacuum evaporation chamber at a vacuum of about $4 \times 10^{-4}$ torr., the vacuum maintained constant with a controlled nitrogen leak. Substantially pure xerographic grade selenium is present in the chamber in liquid form at a temperature of about 295° C. held in a stainless steel crucible.

The vapor receiving surface of the copolymer of styrene and hexylmethacrylate is heated to raise the temperature of the plastic to about 105° C. and more importantly to raise the vapor receiving surface to a viscosity of about $10^4$ poises. Distance from the softenable layer of the copolymer of styrene and hexylmethacrylate to the surface of the molten selenium is about 6 inches. The film at any one point is exposed for less than about 2 seconds to the selenium vapor.

EXAMPLE XIII

A film of aluminized Mylar overcoated with about a 1.5 micron thick layer of a custom synthesized 80/20 mole percent copolymer of styrene and hexylmethacrylate having a molecular weight of about 127,000 (weight average) is used as the vapor receiving surface. The vacuum is maintained at about $10^{-5}$ torr. A mixture of about 60% substantially pure xerographic grade selenium and about 40% arsenic are present in the chamber in liquid form at a temperature of about 330° C. held in a stainless steel crucible.

The vapor receiving surface of the copolymer of styrene and hexylmethacrylate is heated to raise the temperature of the plastic to about 130° C. and more importantly to raise the vapor receiving surface to a viscosity of about $10^4$ poises. The film is exposed to the selenium-arsenic vapors for about 4 minutes to produce about a monolayer of amorphous selenium-arsenic spheres about 0.1 micron in diameter embedded just below the surface of the layer of the copolymer of styrene and hexylmethacrylate.

Although specific components and proportions have been stated in the above description of preferred embodiments of the novel imaging member fabricating method of this invention, other suitable materials, as listed herein, or which exist presently or may be discovered may be used with similar results. In addition other variations may be made in the various processing steps to synergize, enhance or otherwise modify the invention. For example, suitable plasticizers or anti plasticizers, heat and ultra violet stabilizers, colorants, moisture proofing and other proofing agents may be added to the thermoplastics hereof.

It will be understood that various other changes in the details, materials, steps and arrangements of parts which have been hereindescribed and illustrated in order to explain the nature of the invention will occur to and may be made by those skilled in the art upon a reading of this disclosure and such changes are intended to be included within the principle and scope of this invention.

What is claimed is:

1. A method of forming a fracturable layer comprising more than 50% by weight amorphous selenium, said layer at least partially embedded in and contiguous to a vapor receiving thermoplastic surface, comprising the steps of:
    (a) providing a vapor receiving thermoplastic surface at a viscosity between about $10^3$ to about $10^9$ poises;
    (b) vacuum evaporating vapors comprising more than 50% by weight selenium when taken over the total evaporating time onto said vapor receiving thermoplastic surface; and
    (c) vacuum evaporating for a sufficient time to form a fracturable layer having a thickness of between about 0.01 to about 2 microns, and then halting said vacuum evaporating.

2. A fracturable layer forming method according to claim 1 wherein said vacuum evaporating is carried out to form a fracturable layer substantially completely composed of small, discrete, at least partially embedded particles.

3. A fracturable layer forming method according to claim 2 wherein said vacuum evaporating is carried out to completely embed said particles in said vapor receiving thermoplastic.

4. A fracturable layer forming method according to claim 3 wherein said vacuum evaporating is carried out for a sufficient time to form a fracturable layer having a thickness of between about 0.01 to about 1 micron.

5. A fracturable layer forming method according to claim 4 wherein said vacuum evaporating is carried out to form about a monolayer of said particles just completely embedded in said vapor receiving thermoplastic.

6. A fracturable layer forming method according to claim 3 wherein said thermoplastic is a resin.

7. A fracturable layer forming method according to claim 1 wherein said fracturable layer formed consists essentially of amorphous selenium tnd the vapors evaporated during vacuum evaporating consist essentially of selenium.

8. A fracturable layer forming method according to claim 3 wherein said fracturable layer formed consists essentially of amorphous selenium and the vapors evaporated during vacuum evaporating consist essentially of selenium.

9. A fracturable layer forming method according to claim 6 wherein said fracturable layer formed consists essentially of amorphous selenium and the vapors evaporated during vacuum evaporating consist essentially of selenium.

10. A fracturable layer forming method according to claim 6 wherein the vapor receiving thermoplastic surface is at a melt viscosity between about $10^3$ to about 10 poises.

11. A fracturable layer forming method acording to claim 10 where said vapor receiving thermoplastic surface is a material selected from the group consisting of amorphous organic glasses, polystyrenes, copolymers of styrene and acrylates and methacrylates, polyolefins, polyesters, polycarbonates, silicones, alkyds and mixtures thereof.

12. A fracturable layer forming method according to claim 4 wherein said vapor receiving thermoplastic surface comprises a copolymer of styrene and a material selected from the group consisting of acrylates and methacrylates.

13. A fracturable layer forming method according to claim 12 wherein said vapor receiving thermoplastic surface comprises about an 80/20 mole percent copolymer of styrene and hexylmethacrylate.

14. A fracturable layer forming method according to claim 10 wherein said vapor receiving thermoplastic surface comprises a copolymer of styrene and a material selected from the group consisting of acrylates and methacrylates.

15. A fracturable layer forming method according to claim 3 wherein said vapor receiving thermoplastic surface is a material selected from the group consisting of amorphous organic glasses, polystyrenes, copolymers of styrene and acrylates and methacrylates, polyolefins, polyesters, polycarbonates, silicones, alkyds and mixtures thereof.

16. A method of forming a fracturable layer comprising selenium, said layer at least partially embedded in and contiguous to a vapor receiving thermoplastic surface, comprising the steps of:
    (a) providing a vapor receiving thermoplastic surface at a viscosity between about $10^3$ to about $10^9$ poises;
    (b) heating a source comprising selenium above its melting temperature whereby vapors comprising selenium are formed;
    (c) entraining said vapors within a stream of inert gas;
    (d) directing said vapor containing stream against said vapor receiving thermoplastic surface; and
    (e) directing said stream for a sufficient time to form a fracturable layer having a thickness of between about 0.01 to about 2 microns, and then halting said directing.

17. A fracturable layer forming method according to claim 16 wherein said fracturable layer comprises amorphous selenium, and wherein said process is carried out to form a fracturable layer substantially completely composed of small, discrete, at least partially embedded particles, including the additional step before the directing of said vapors against said vapor receiving thermoplastic surface of heating the stream of black selenium vapors formed by heating a source of selenium above its melting temperature, whereby said black selenium vapors undergo a distinctly visible transformation to red selenium vapors which are directed against said vapor receiving thermoplastic surface.

18. A fracturable layer forming method according to claim 17 wherein said stream is heated to convert the black selenium vapors to the red selenium vapors by increasing the heat of the black selenium vapors at least to a temperature in the range of between about 300° C. to about 500° C.

19. A fracturable layer forming method according to claim 18 wherein said stream heating is accomplished by directly contacting said black selenium vapors with a flame.

20. A fracturable layer forming method according to claim 19 wherein said flame is at a temperature of at least about 500 to about 600° C.

21. A fracturable layer forming method according to claim 16 wherein said vapor receiving thermoplastic surface is at a melt viscosity between about $10^3$ to about $10^6$ poises and wherein said vapors directed comprise more than 50% by weight selenium when taken over the total directing time to form a fracturable layer comprising more than 50% by weight selenium.

22. A fracturable layer forming method according to claim 18 wherein said vapor receiving thermoplastic surface is at a melt viscosity between about $10^3$ to about $10^6$ poises and wherein said vapors directed comprise more than 50% by weight selenium when taken over the total directing time to form a fracturable layer comprising more than 50% by weight selenium.

23. A fracturable layer forming method according to claim 17 wherein said process is carried out to completely embed said particles in said vapor receiving thermoplastic.

24. A fracturable layer forming method according to claim 23 wherein said thermoplastic is a resin.

25. A fracturable layer forming method according to claim 24 wherein said vapor receiving thermoplastic surface is a material selected from the group consisting of amorphous organic glasses, polystyrenes, copolymers of styrene and acrylates and methacrylates, polyolefins, polyesters, polycarbonates, silicones, alkyds and mixtures thereof.

26. A fracturable layer forming method according to claim 24 wherein said vapor receiving thermoplastic surface comprises a copolymer of styrene and a material selected from the group consisting of acrylates and methacrylates.

27. A fracturable layer forming method according to claim 26 wherein said vapor receiving thermoplastic surface comprises about an 80/20 mole percent copolymer of styrene and hexylmethacrylate.

28. A fracturable layer forming method according to claim 16 wherein said fracturable layer formed consists essentially of amorphous selenium and the vapors directed during the directing of said vapor containing stream consist essentially of selenium.

29. A fracturable layer forming method according to claim 22 wherein said fracturable layer formed consists essentially of amorphous selenium and the vapors directed during the directing of said vapor containing stream consist essentially of selenium.

30. A fracturable layer forming method according to claim 23 wherein said process is carried out to form about a monolayer of said particles just completely embedded in said vapor receiving thermoplastic.

31. A fracturable layer forming method according to claim 30 wherein said fracturable layer formed consists essentially of amorphous selenium and the vapors directed during the directing of said vapor containing stream consist essentially of selenium.

32. A fracturable layer forming method according to claim 30 wherein said directing is carried out for a sufficient time to form a fracturable layer having a thickness of between about 0.01 to about 1 micron.

References Cited

UNITED STATES PATENTS

| | | | |
|---|---|---|---|
| 2,739,079 | 3/1956 | Keck | 96—1.5X |
| 2,753,278 | 7/1956 | Bixby et al. | 96—1X |
| 2,901,348 | 8/1959 | Dessaner et al. | 96—1 |
| 3,077,386 | 2/1963 | Blakney et al. | 23—209 |
| 3,102,026 | 8/1963 | Metcalfe et al. | 96—1 |
| 3,219,450 | 11/1965 | Goldberg | 96—94X |
| 3,243,293 | 3/1966 | Stockdale | 96—1 |
| 3,254,997 | 6/1966 | Schaffert | 96—1 |
| 3,312,547 | 4/1967 | Levy | 96—1.5 |
| 3,391,022 | 7/1968 | Saito | 117—34X |

OTHER REFERENCES

McNeil et al., Selenium Coatings in the Thickness Range 0.2 to 2.5 Microns for Xerography, Journal of Photographic Science, vol. 7, pp. 25–32 (1959).

CHARLES E. VAN HORN, Primary Examiner

U.S. Cl. X.R.

23—209; 96—1.5; 117—34, 46FC, 62, 106R, 119, 138.8A, 218

UNITED STATES PATENT OFFICE
CERTIFICATE OF CORRECTION

Patent No. 3,598,644      Dated  August 10, 1971

Inventor(s)  W. L. Goffe et al

It is certified that error appears in the above-identified patent and that said Letters Patent are hereby corrected as shown below:

Column 10, Example VI, delete "0.3" listed under Type of deposited layer and insert dotted lines.

Claim 7, line 3, delete "tnd" and insert --and--.

Claim 10, line 3, delete "10" and insert $--10^6--$.

Signed and sealed this 25th day of January 1972.

(SEAL)
Attest:

EDWARD M. FLETCHER, JR.
Attesting Officer

ROBERT GOTTSCHALK
Commissioner of Patents